United States Patent
Kothari et al.

(10) Patent No.: US 11,409,261 B2
(45) Date of Patent: Aug. 9, 2022

(54) PREDICTING DISTRIBUTIONS OF VALUES OF LAYERS FOR THREE-DIMENSIONAL PRINTING

(71) Applicant: HEWLETT-PACKARD DEVELOPMENT COMPANY, L.P., Houston, TX (US)

(72) Inventors: Sunil Kothari, Palo Alto, CA (US); Kristopher Li, Palo Alto, CA (US); Viseth Sean, Orange, CA (US); Jun Zeng, Palo Alto, CA (US); Lihua Zhao, Palo Alto, CA (US); Goffril Obegi, Vancouver, WA (US); Gary J. Dispoto, Palo Alto, CA (US); Tod Heiles, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 55 days.

(21) Appl. No.: 16/077,669

(22) PCT Filed: Jan. 27, 2017

(86) PCT No.: PCT/US2017/015339
§ 371 (c)(1),
(2) Date: Aug. 13, 2018

(87) PCT Pub. No.: WO2018/140034
PCT Pub. Date: Aug. 2, 2018

(65) Prior Publication Data
US 2019/0056717 A1 Feb. 21, 2019

(51) Int. Cl.
*G05B 19/4099* (2006.01)
*B33Y 50/02* (2015.01)
(Continued)

(52) U.S. Cl.
CPC .......... *G05B 19/4099* (2013.01); *B22F 10/20* (2021.01); *B29C 64/386* (2017.08);
(Continued)

(58) Field of Classification Search
USPC .......................................................... 700/98
See application file for complete search history.

(56) References Cited

U.S. PATENT DOCUMENTS 6,780,368 B2   8/2004 Liu et al.
6,815,636 B2   11/2004 Chung et al.
(Continued)

FOREIGN PATENT DOCUMENTS

CN   106061713 A   10/2016
TW   201639691 A * 11/2016
(Continued)

OTHER PUBLICATIONS

Machine Translation of WO-2015196904-A1 (Year: 2015).*
(Continued)

*Primary Examiner* — Santosh R Poudel
(74) *Attorney, Agent, or Firm* — HP Inc. Patent Department

(57) ABSTRACT

In some examples, a distribution of values of a property of a given layer to be printed as part of three-dimensional (3D) printing is predicted, wherein the predicting is based on a distribution of values of the property in a previous layer that has been printed as part of the 3D printing. 3D printing of an object is controlled based on the predicted distribution of values of the property of the given layer.

16 Claims, 6 Drawing Sheets

(51) Int. Cl.
*B29C 64/393* (2017.01)
*G05B 6/00* (2006.01)
*B29C 64/386* (2017.01)
*B22F 10/20* (2021.01)
*B22F 10/30* (2021.01)

(52) U.S. Cl.
CPC ............ *B29C 64/393* (2017.08); *B33Y 50/02* (2014.12); *G05B 6/00* (2013.01); *B22F 10/30* (2021.01)

(56) References Cited

U.S. PATENT DOCUMENTS

| | | | |
|---|---|---|---|
| 8,784,721 | B2 | 7/2014 | Philippi et al. |
| 9,399,321 | B2 | 7/2016 | Ljungblad |
| 10,421,267 | B2 * | 9/2019 | Reese ................. B33Y 50/02 |
| 2002/0020945 | A1 | 2/2002 | Cho et al. |
| 2011/0222081 | A1 | 9/2011 | Yi et al. |
| 2013/0080125 | A1 * | 3/2013 | Baseman ......... G05B 19/41875 703/2 |
| 2015/0033201 | A1 * | 1/2015 | Vaid ................... G03F 7/70616 716/135 |
| 2015/0037601 | A1 * | 2/2015 | Blackmore ........ B23K 15/0086 428/600 |
| 2015/0161520 | A1 * | 6/2015 | Kaushal ........... G05B 19/41885 700/121 |
| 2015/0269282 | A1 * | 9/2015 | Nelaturi .................. G06F 30/00 700/98 |
| 2015/0321422 | A1 * | 11/2015 | Boyer .................. B29C 64/393 264/497 |
| 2016/0082666 | A1 | 3/2016 | De et al. |
| 2016/0096318 | A1 * | 4/2016 | Bickel .................. B33Y 30/00 264/40.1 |
| 2016/0136982 | A1 | 5/2016 | Heath |
| 2016/0158962 | A1 | 6/2016 | Balistrer et al. |
| 2016/0184893 | A1 * | 6/2016 | Dave ..................... B33Y 50/02 419/53 |
| 2016/0320771 | A1 * | 11/2016 | Huang ................... B29C 67/00 |
| 2016/0349724 | A1 * | 12/2016 | Cortes .................... B33Y 50/00 |
| 2017/0056970 | A1 * | 3/2017 | Chin ..................... B33Y 30/00 |
| 2017/0151722 | A1 * | 6/2017 | Prasad ................... B33Y 10/00 |
| 2018/0009128 | A1 * | 1/2018 | Sokol ................... B29C 64/129 |
| 2018/0133801 | A1 * | 5/2018 | Buller .................. B22F 3/1055 |
| 2018/0207722 | A1 * | 7/2018 | Feldmann .............. B33Y 10/00 |

FOREIGN PATENT DOCUMENTS

| | | | | |
|---|---|---|---|---|
| WO | WO-2015108547 | A2 * | 7/2015 | .......... B29C 64/393 |
| WO | WO-2015108555 | A1 | 7/2015 | |
| WO | WO-2015167520 | A1 * | 11/2015 | ............ B29C 67/00 |
| WO | WO-2015196904 | A1 * | 12/2015 | ............ B29C 67/00 |

OTHER PUBLICATIONS

Machine Translation of TW 201639691 A (Year: 2016).*
Abdelrahman et al., "Layerwise Monitoring of Polymer Laser Sintering Using Thermal Imaging", Retrieved from Internet: https://sffsymposium.engr.utexas.edu/sites/default/files/2014-021-Abdelrahman.pdf, Jun. 13, 2014, pp. 244-255.
Rumelhart et al., "Learning Representations by Back-Propagating Errors", Nature, vol. 323, No. 9, Retrieved from Internet: http://www.cs.toronto.edu/~hinton/absps/naturebp.pdf, Oct. 9, 1986, 4 Pages.
Kim et al., "Process-Level Modeling and Simulation for HP's Multi Jet Fusion 3D Printing Technology", Retrieved from Internet: https://ptolemy.berkeley.edu/projects/chess/pubs/1171/KimEtAl_3DPrinting_CPPS_2016.pdf, Apr. 12, 2016, 4 Pages.

* cited by examiner

PREDICTING DISTRIBUTIONS OF VALUES OF LAYERS FOR THREE-DIMENSIONAL PRINTING

BACKGROUND

A three-dimensional (3D) printing system can be used to form 3D objects. A 3D printing process involves depositing successive layers of build material(s) under control of a computer based on an electronic representation of a 3D object. The layers are successively added until the entire 3D object is formed.

BRIEF DESCRIPTION OF THE DRAWINGS

Some implementations of the present disclosure are described with respect to the following figures.

DETAILED DESCRIPTION

Figure 1:
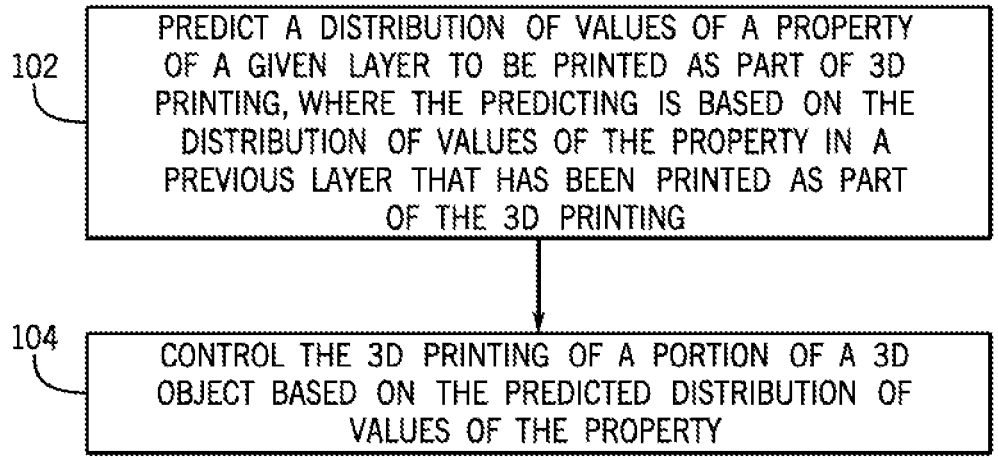
FIG. 1 is a flow diagram of a process of controlling three-dimensional (3D) using predicted values of a property, according to some examples.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A three-dimensional (3D) printing process where successive layers of a build material (or multiple build materials) are formed to build a 3D object can be referred to as an additive manufacturing process. In some examples, a build material can include a powdered build material that is composed of particles in the form of fine powder or granules. The powdered build material can include metal particles, plastic particles, polymer particles, or particles of other materials.

When a layer of build material is deposited, an agent can be delivered to the layer of build material. The delivered agent can include a fusing agent to fuse a portion of the layer of build material, where the fused portion corresponds to a part of the 3D object. An agent can also be a detailing agent that defines the boundary of a portion of the layer of build material that is to be fused or coalesced. Heat can also be applied to solidify each successive layer of the building material.

In other examples, other types of 3D printing processes can be employed, including selective laser sintering 3D printing processes in which a laser is used to selectively fuse a layer of build material. Also, although reference is made to examples where a build material is initially in powder form, in other examples, a build material can be in a different form.

A distribution of temperature of a layer of build material that is to be formed as part of a 3D printing process can depend on temperatures of previously printed layers of the 3D object that is being built. If the temperature of the layer to be printed is not controlled to within a specified tolerance, then that may affect mechanical or other characteristics of the 3D object. For example, if the temperature of a layer that is being formed is too high or too low, then that can cause the mechanical strength or an operational characteristic of at least a portion of the 3D object to not meet a target specification. Generally, the ability to print 3D objects with consistent mechanical or other characteristics depends on the ability to predict layer-to-layer interaction during the 3D printing process in a 3D printing system.

In accordance with some implementations of the present disclosure, prediction solutions are employed to predict a property of a given layer that is to be printed as part of 3D printing, where the predicting is based on values of the property in a previous layer (or multiple previous layers) that have been printed as part of the 3D printing. In some examples, the predicted property can include temperature. In other examples, the predicted property can include density, thickness, or some other property of the given layer to be printed. Generally, according to some implementations of the present disclosure, a distribution of values of a property of a given layer that has not yet been printed can be predicted based on a distribution of values of the property in a previous layer that has been printed.

The predicted distribution of values of the property of the given layer can either be used to control 3D printing by a 3D printing system, or to update a model used as part of simulating 3D printing by the 3D printing system.

Note that although reference is made to predicting values of a property of a layer of build material, it is noted that solutions according to some implementations can predict values of multiple properties of a layer of build material in further examples.

FIG. 1 is a flow diagram of a process of controlling 3D printing according to some implementations. The process of FIG. 1 includes predicting (at 102) a distribution of values of a property of a given layer to be printed as part of 3D printing, where the predicting is based on the distribution of values of the property in a previous layer that has been printed as part of the 3D printing. As explained further below, the predicting is based on use of a model (or alternatively, of multiple different models).

The process further includes controlling (at 104) the 3D printing of a portion of a 3D object based on the predicted distribution of values of the property. In this manner, by using techniques or mechanisms according to some implementations, 3D printing can be controlled such that 3D objects with consistent mechanical characteristics or other characteristics can be achieved. An example of a mechanical characteristic can include a mechanical strength of a portion of a 3D object. Another characteristic of the 3D object can include a functional characteristic, which relates to a function or operation to be performed by the portion of the 3D object.

As an example, to print a 3D object by a 3D printing system, a target specification can indicate that a given layer of the 3D object is to be printed at a target temperature (or a target distribution of temperatures across the given layer). Printing the given layer at the target temperature (distribution) can be performed to achieve a target mechanical characteristic or functional characteristic for a portion of the 3D object. However, using predicting solutions according to some implementations of the present disclosure, it may be determined that the predicted temperature (or distribution of temperatures) of the given layer (that has not yet been printed) may be different from the target temperature (or distribution of temperatures), based on the temperature (or distribution of temperatures) of a previously printed layer (or layers) of the 3D object. Based on the deviation of the predicted temperature from the target temperature, the 3D printing system can modify heating equipment of the 3D printing system to produce a target level of heat so that when the given layer is printed by the 3D printing system, the given layer will be printed at the target temperature. For example, if the predicted temperature is greater than the target temperature (because a previously printed layer will contribute heat to the given layer to cause the temperature of the given layer to rise), then the heating equipment of the 3D printing system can be adjusted to produce less heat so that when the given layer is printed, it will be printed at the target temperature (due to contributions of heat from the heating equipment and from the previously printed layer).

In addition, or as an alternative, the prediction solutions according to some implementations can be applied in the context of simulating an operation of a 3D printing system. A simulator can use a model (or multiple models) to simulate the operation of the 3D printing system.

An example of a model (which can be used to predict values of a property of a layer of a 3D object) can include a regression model that receives an input parameter (or multiple input parameters) and produces an output parameter (or multiple output parameters) based on the input parameter(s). For example, the regression model can take as an input a distribution of values of a property (e.g., temperature, density, thickness, etc.) of a previous layer and produce a predicted distribution of values of the property for a current layer that is to be printed. A regression model estimates the relationship(s) among variables. The regression model can include a linear regression model or a non-linear regression model. A linear regression model represents a relationship between a dependent variable (the variable that is output) and an independent variable (the variable that is input), where the relationship(s) between the dependent variable(s) and the independent variable(s) is (are) represented using a linear predictor function. A non-linear regression model, on the other hand, specifies relationship(s) between dependent variable(s) and independent variable(s) using a non-linear predictor function.

A linear regression model can be generated by linearly fitting historical data points (including values of a dependent variable and values of an independent variable) onto a line in multi-dimensional space, where the line represents the linear predictor function. A non-linear regression model can be generated by non-linearly fitting historical data points onto a curve in multi-dimensional space, where the curve represents the non-linear predictor function.

In other examples, other types of models can be used.

Figure 2:
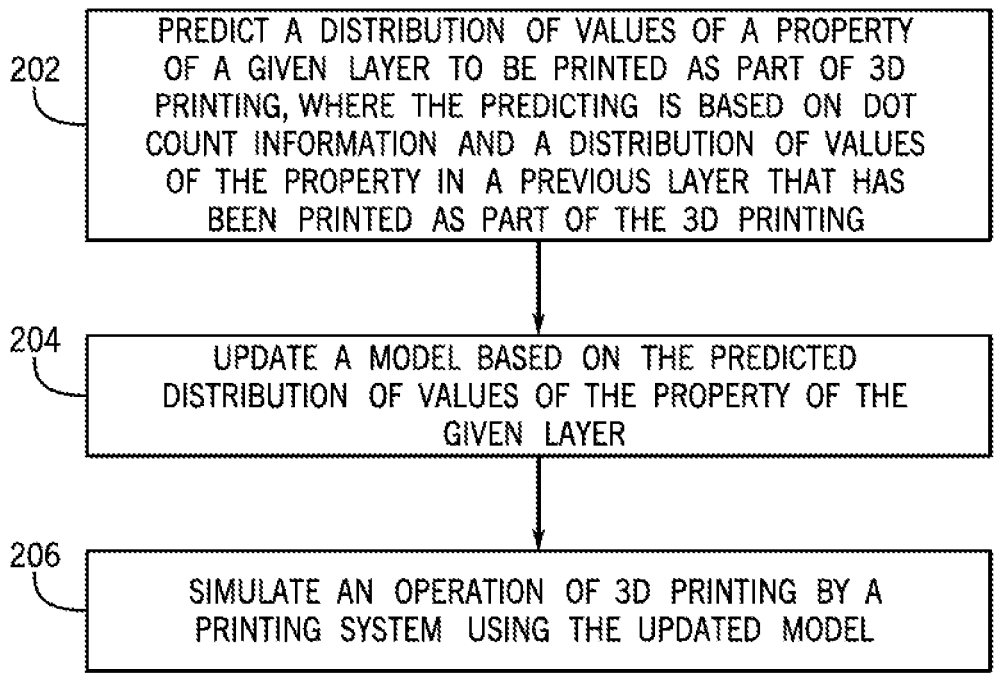
FIG. 2 is a flow diagram of a process of simulating 3D using predicted values of a property, according to alternative examples.

FIG. 2 is a flow diagram of a simulation process according to some implementations. The simulation process includes predicting (at 202) a distribution of values of a property (e.g., temperature, density, thickness, etc.) of a given layer to be printed as a part of 3D printing, where the predicting is based on dot count information and a distribution of values of the property in a previous layer that has been printed as part of the 3D printing. As used here, "dot count information" refers to an amount of a 3D printing agent (e.g., a fusing agent, a detailing agent, a printing fluid such as ink, etc.) to be provided at a given location (generally referred to as a "dot") of multiple locations (i.e., "dots") on a print target. The print target can include a print platform on which a 3D object is to be formed. A print target can also refer to a sub-assembly of previously printed layers of the 3D object that has been formed on the print platform.

In examples where dot count information is considered in predicting values of a property, the model that is used to perform the predicting considers the following as independent variables: (1) a property of a previously printed layer, and (2) the dot count. Based on the values of the property of the previously printed layer and the values of the dot count, the model produces a dependent variable as output, i.e., the values of the property of the given layer that is to be printed.

The consideration of dot count information is based on the fact that varying the amount of a specific agent (or agents) used in printing a layer can change the effect on values of a property (e.g., temperature or other property) of the layer.

The simulation process can further updates (at 204) a model, such as the model used to predict the distribution of values of the property of the given layer. The updating of the model uses a feedback technique that is based on the predicted distribution of values of the property of the given layer (as computed at 202). Details regarding the feedback technique are discussed further below.

The simulation process further simulates (at 206) an operation of 3D printing by a printing system using the updated model. The simulation can be carried out based on use of (1) a system model that represents various operational parameters of the 3D printing system, and (2) the updated model that relates an input property (or input properties) to an output property (or output properties).

Figure 3:
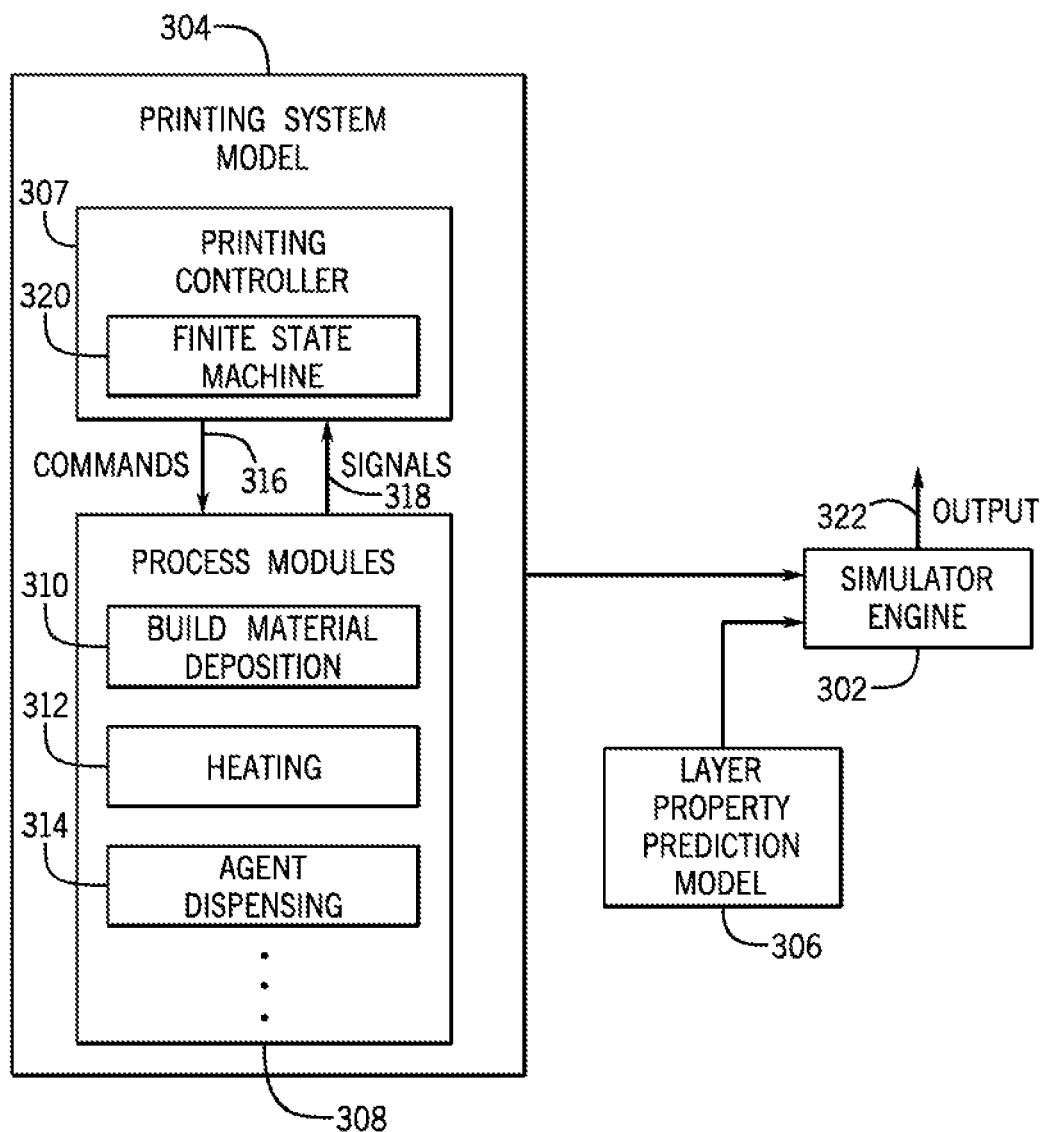
FIG. 3 is a block diagram of an arrangement for simulating 3D printing system according to some examples.

FIG. 3 is a block diagram of an example arrangement to perform simulation of the 3D printing by a 3D printing system according to some examples. The arrangement of FIG. 3 includes a simulator engine 302 that receives as input a printing system model 304 and a layer property prediction model 306. The simulator engine 302 can be implemented as a hardware processing circuit, such as any or some combination of the following: a microprocessor, a core of a multi-core microprocessor, a microcontroller, a programmable integrated circuit device, a programmable gate array, and so forth. In further examples, the simulator engine 302 can include a combination of a hardware processing circuit and machine-readable instructions executable on the hardware processing circuit.

The simulator engine 302 performs simulations according to some examples using the printing system model 304 and the layer property prediction model 306. The printing system model 304 represents various components of a 3D printing system, including a printing controller and various process modules of the 3D printing system. The printing system model 304 includes a sub-model 307 that represents the printing controller, and a sub-model 308 that represents the various process modules.

The printing controller controls the printing processes and assign specific tasks to the process modules, which include individual stages of 3D printing. For example, the stages of 3D printing can include a build material deposition stage 310 to deposit a layer of build material onto a print target. The stages can also include a heating stage 312 to perform preheating of a layer of build material. Additionally, the stages can include an agent dispensing stage 314 to dispense a specific agent, such as a fusing agent, a detailing agent, and so forth. There can be other stages of the 3D printing system.

The printing system model 304 models interactions between the printing controller (as represented by the sub-model 307) and the process modules (as represented by the sub-model 308). The printing controller sends commands 316 to the process modules, and the process modules can return signals 318 to the printing controller. For example, a signal 318 can indicate when a layer of build material has been deposited, or indicate when preheating of a layer of build material has reached a target temperature, or indicate when dispensing of an agent has been completed, as examples.

In some examples, the sub-model 307 of the printing controller includes a finite state machine 320 that represents operations of the printing controller 307. The finite state machine 320 can represent various operational states of the printing controller 307, which can depend on which of the stages of the printing system are active or completed, and which remain to be activated. For example, to perform fusing of a layer of build material, the finite state machine 320 can issue a command to cause a printhead (that is to dispense the fusing agent) to be activated from an idle state to an active state, and to move the printhead to a target location (or target locations). At the target location(s), the finite state machine 320 can issue a command to activate the printhead to dispense the fusing agent onto the layer of build material. After the fusing agent has been dispensed, the printhead can return a signal to the finite state machine 320 to indicate completion, at which time the finite state machine 320 can issue a command to cause the printhead to be deactivated to an idle state.

In other examples, other control processes can be controlled by the printing controller.

The layer property prediction model 306 can refer to the model discussed further above relating to predicting values of a property of a given layer to be printed based on an input property (or multiple input properties), including values of a property of a previously printed layer, dot count information, and so forth.

Using the printing system model 304 and the layer property prediction model 306, the simulator engine 302 can perform simulation of the operations of the 3D printing system. The simulator engine produces an output 322, which can include information that can be displayed in a graphical user interface to be viewed by a user. For example, the output 322 can indicate various operational parameters of the 3D printing system that were used during 3D printing, as well as characteristics of layers of build material that have been formed in the simulation.

Figure 4:
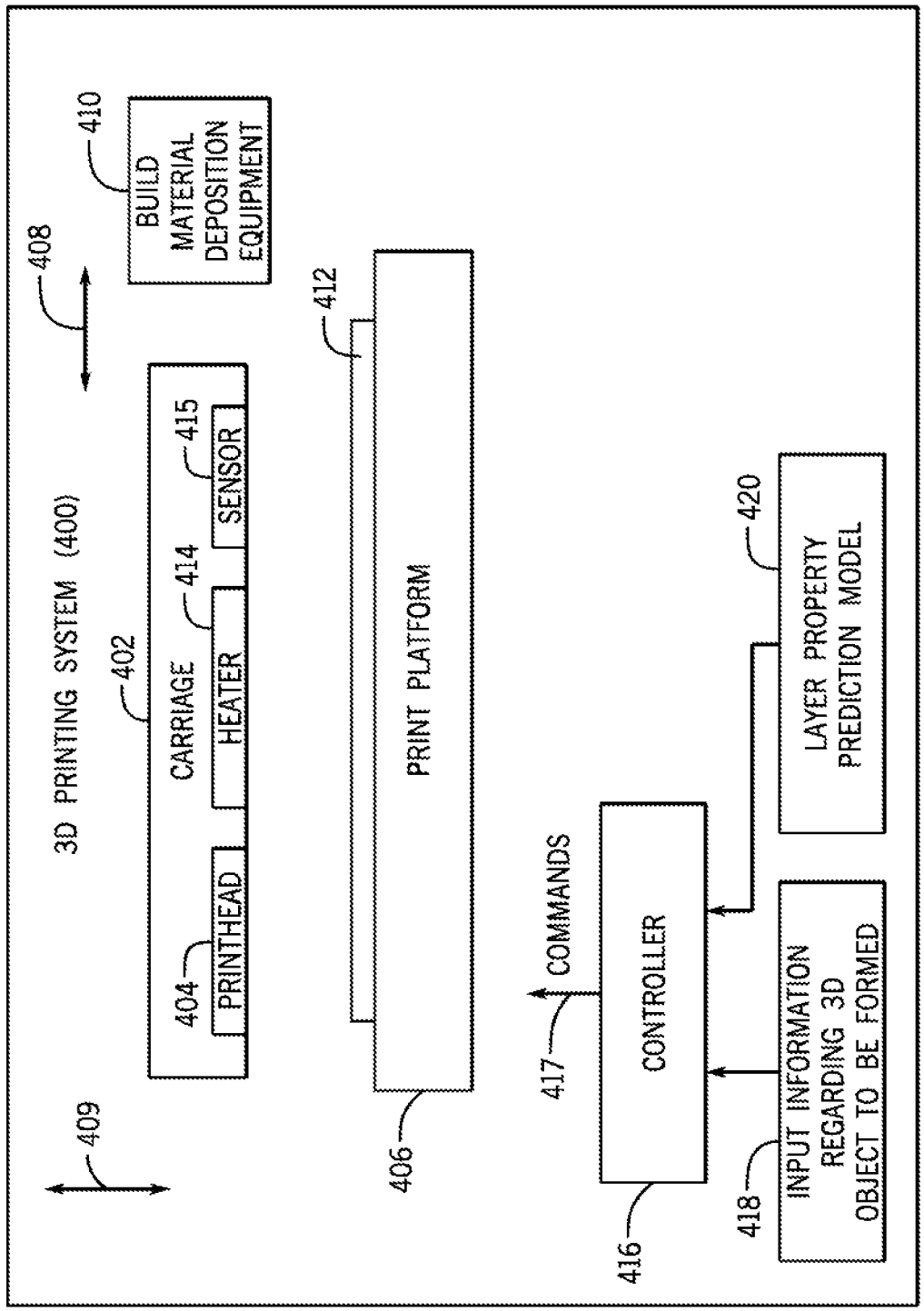
FIG. 4 is a block diagram of a 3D printing system, according to some examples.

FIG. 4 is a block diagram of an example 3D printing system 400 that includes a carriage 402 that carries a printhead 404 according to some examples. A "carriage" can refer to a structure that is used for carrying components, including the printhead 404, as well as other components, such as a heater 414 to produce heat, a sensor 415 to sense a respective parameter, and so forth. In other examples, the printhead 204, the heater 214, and the sensor 216 can be mounted on separate carriages. In further examples, the sensor 216 can be part of the printhead 204.

The heater 414 can be used to preheat a layer of build material, and the sensor 415 can be used to sense a parameter, such as a distribution of temperatures across a layer of build material. In further examples, the 3D printing system 400 can include multiple printheads, and/or multiple heaters, and/or multiple sensors.

The printing system 400 also includes a print platform 406. The carriage 402 and the print platform 406 are movable with respect to each other (along the horizontal axes as well as the vertical axis). In some examples, the print platform 406 is stationary while the carriage 402 can be moved along an axis 408. In other examples, the carriage 402 can be stationary while the print platform 406 is moved relative to the printhead 402 along the axis 408. In further examples, both the carriage 402 and the print platform 406 can be moved along the axis 408. Note further that it is possible for the carriage 402 and the print platform 404 to be movable relative to each other along multiple different axes, including another horizontal axis that is perpendicular to the axis 408, and in a vertical axis 409, i.e., the axis where the print platform 206 and the carriage 202 can be moved to be closer together or farther apart). The relative motion of the carriage 402 and the print platform 406 can be driven by a motor (or multiple motors), not shown.

The relative motion of the carriage 402 and the print platform 406 can cause the printhead 404 to be placed at different positions. The printhead 404 can be activated to deliver an agent towards a target 412 on the upper surface of the print platform 406. In 3D printing system, the target 412 can include a layer of build material onto which an agent (ink, fusing agent, detailing agent, etc.) can be delivered by the printhead 404.

The printing system 400 further includes a build material deposition equipment 410 to deposit a layer of build material onto the print platform 406. In some examples, the layer of build material can be deposited in powder form, and the powdered build material can be subjected to further processing to form a 3D object portion of a given shape, size, and color (using ink, a fusing agent, a detailing agent, etc.).

The printing system 400 also includes a controller 416 that can be used to control 3D printing by the printing system 400. The controller 416 can include a hardware processing circuit, or a combination of a hardware processing circuit and machine-readable instructions executable on the hardware processing circuit.

In some examples, the controller 416 can control operations of the build material deposition equipment 410, the carriage 402, the printhead 404, the heater 414, and other stages of the 3D printing system 400, by sending commands 417 to the respective stages. The control of the operations of the 3D printing system by the controller 416 can be based on input information 418 regarding a 3D object that is to be formed. The input information 418 regarding a 3D object that is to be formed can be generated using a computer-aided design (CAD) application, for example.

The controller 416 can also receive as input a layer property prediction model 420, which can be used to predict a distribution of values of a property of a layer to be printed based on input parameter(s), as discussed further above. Using the predicted distribution of values of a property of the layer, the controller 416 can modify parameters used to control the various stages of the 3D printing system 400, including the build material deposition equipment 410, the heater 414, the printhead 404, and so forth.

More generally, according to some examples, the controller 416 can implement the process of FIG. 1 as part of controlling 3D printing in the 3D printing system 400.

Figure 5:
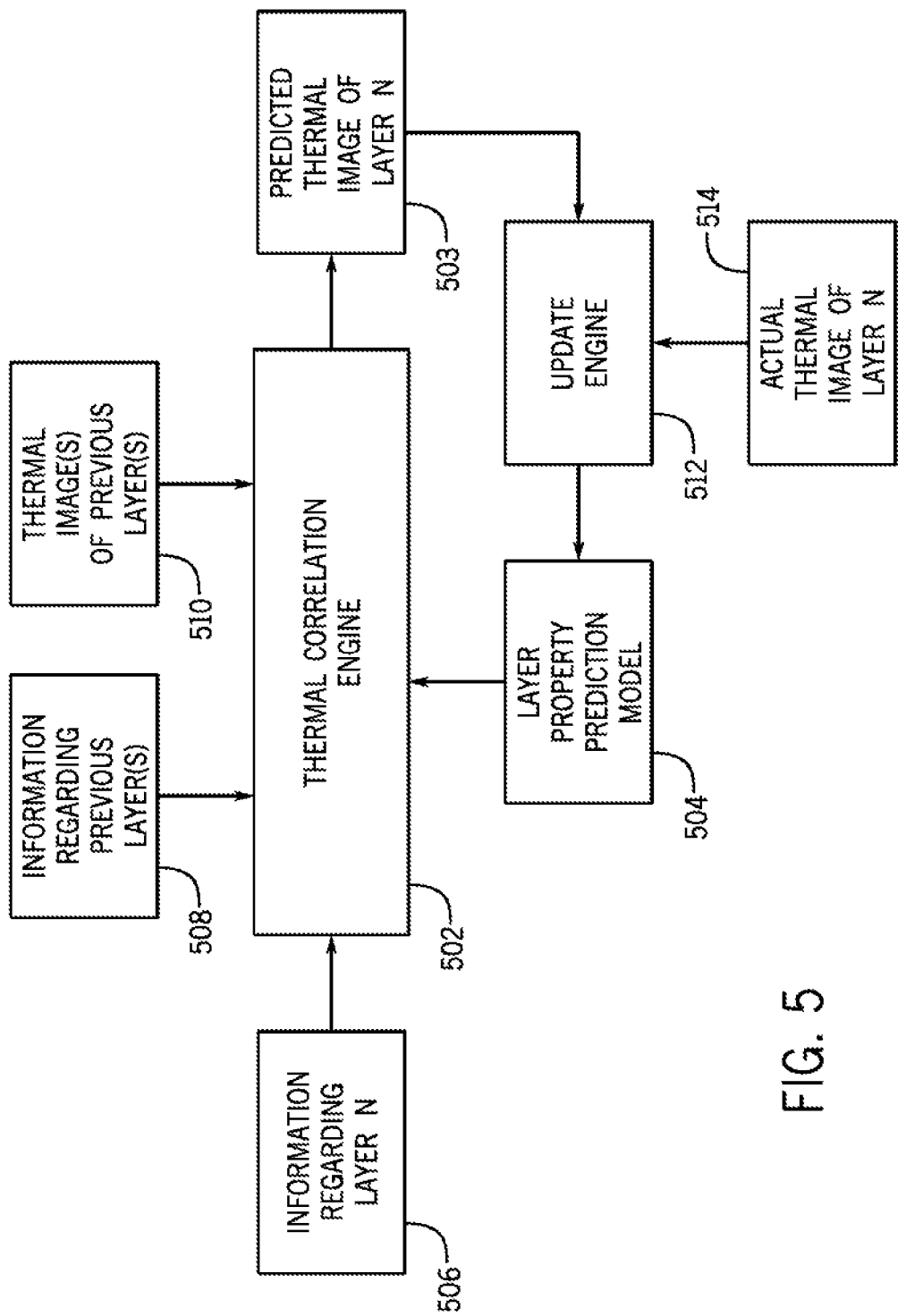
FIG. 5 is a block diagram of an arrangement that includes a thermal correlation engine, according to further examples.

FIG. 5 is a block diagram of an example arrangement that includes a thermal correlation engine 502 that receives various inputs and produces a predicted thermal image 503 of a layer N of build material, where layer N is the current layer that is to be printed in a 3D printing process. The predicted thermal image 503 is a representation that indicates values of a temperature across layer N. For example, the predicted thermal image 503 can include data values of the temperature at different locations across layer N, can include a graphical representation of the values of the temperature at different locations across layer N (e.g., different temperature values are indicated using different colors), or can include any other type of representation of temperature values of layer N. Although reference is made to a "thermal image" in some examples, it is noted that in other examples, other representations of other types of properties can be used.

The thermal correlation engine 502 can be implemented as a hardware processing circuit or as a combination of a hardware processing circuit and machine-readable instructions executable on the hardware processing circuit. In some examples, the thermal correlation engine 502 can be part of the simulation engine 302 of FIG. 3, or part of the controller 416 of FIG. 4.

The inputs to the thermal correlation engine 502 can include the following:
- A layer property prediction model 504 (e.g., the layer property prediction model 306 of FIG. 3 or the layer property prediction model 420 of FIG. 4).
- Information 506 regarding layer N, which contains various information for the layer N that is to be printed. For example, the information 506 can include dot count information for layer N. As further examples, the information 506 can also include other information, including a thickness of layer N, a density of layer N, and so forth.
- Information 508 of a previous layer or multiple previous layers that has (have) been printed, including layer N−1 (the layer immediately below layer N), layer N−2, and so forth. The information 508 can include dot count information as well as other information about the previous layer or multiple previous layers.
- A thermal image 510 of a previous layer or thermal images of multiple previous layers, to represent temperature distribution(s) of the previous layer(s). The thermal image 510 of each previous layer can be acquired by the sensor 415 (or sensors) of the 3D printing system 400 shown in FIG. 4, for example. The sensor(s) 415 can be used to sense a temperature distribution of a printed layer, and to communicate the sensed temperature distribution to the controller 416 for storage in a storage medium.

Based on the inputs (504, 506, 508, 510), the thermal correlation engine 502 is able to produce the predicted thermal image for layer N, which includes the distribution of temperature values for layer N.

A feedback path is also shown in FIG. 5, where the feedback path includes an updated engine 512 that is able to use the predicted thermal image 503 for layer N to update the layer property prediction model 504. The update engine 512 can be implemented as a hardware processing circuit or as a combination of a hardware processing circuit and machine-readable instructions executable on the hardware processing circuit.

When an actual thermal image 514 for layer N (as measured by the sensor(s) 415 of FIG. 4, for example, when the layer N has actually been printed) is later received by the update engine 512, the update engine 512 can compare the actual thermal image 514 for layer N to the predicted thermal image 503 for layer N, and can adjust the layer property prediction model 504 accordingly. Generally, the layer property prediction model 504 can be modified to reduce (or minimize) the difference between the actual thermal image 514 for layer N and the predicted thermal image 503 for layer N.

In some examples, the layer property prediction model 504 can be implemented as a neural network that includes various nodes. The nodes of the neural network can be associated with weights. Based on received inputs (e.g., a distribution of values of a property of a previously printed layer, dot count information, etc.), the neural network can produce an output (e.g., a distribution of values of a property of a layer to be printed), according to the weights associated with the nodes of the neural network.

The temperature at layer N is computed from the weighted thermal contribution of the layers underneath. Assume the total number of layers is P, then a point temperature θ (N,x,y) at a location (x,y) for a given layer N is computed as:

$$\theta(N, x, y) = \sum_{k=0}^{P-L} \sum_{x=0}^{A} \sum_{y=0}^{B} W^{kxy\theta xyk}$$

In the foregoing equation, A and B denote the index of the last pixel in the x and y directions, and $W^{kxy\theta xyk}$ represents the respective weight used (e.g. a weight of a node of a neural network). A temporal decay function can also be integrated in the above formula in further examples.

The weights associated with the nodes of the neural network can be learned over time, as new data is received, which in some implementations include the predicted distribution of values of a property of a layer. An example of learning of a neural network is described in David E. Rumelhart et al., "Learning Representations by Back-Propagating Errors," October 1986. In other examples, other techniques of learning neural networks can be employed.

In further examples, instead of implementing the layer property prediction model 504 as a neural network, other types of models can be used.

Figure 6:
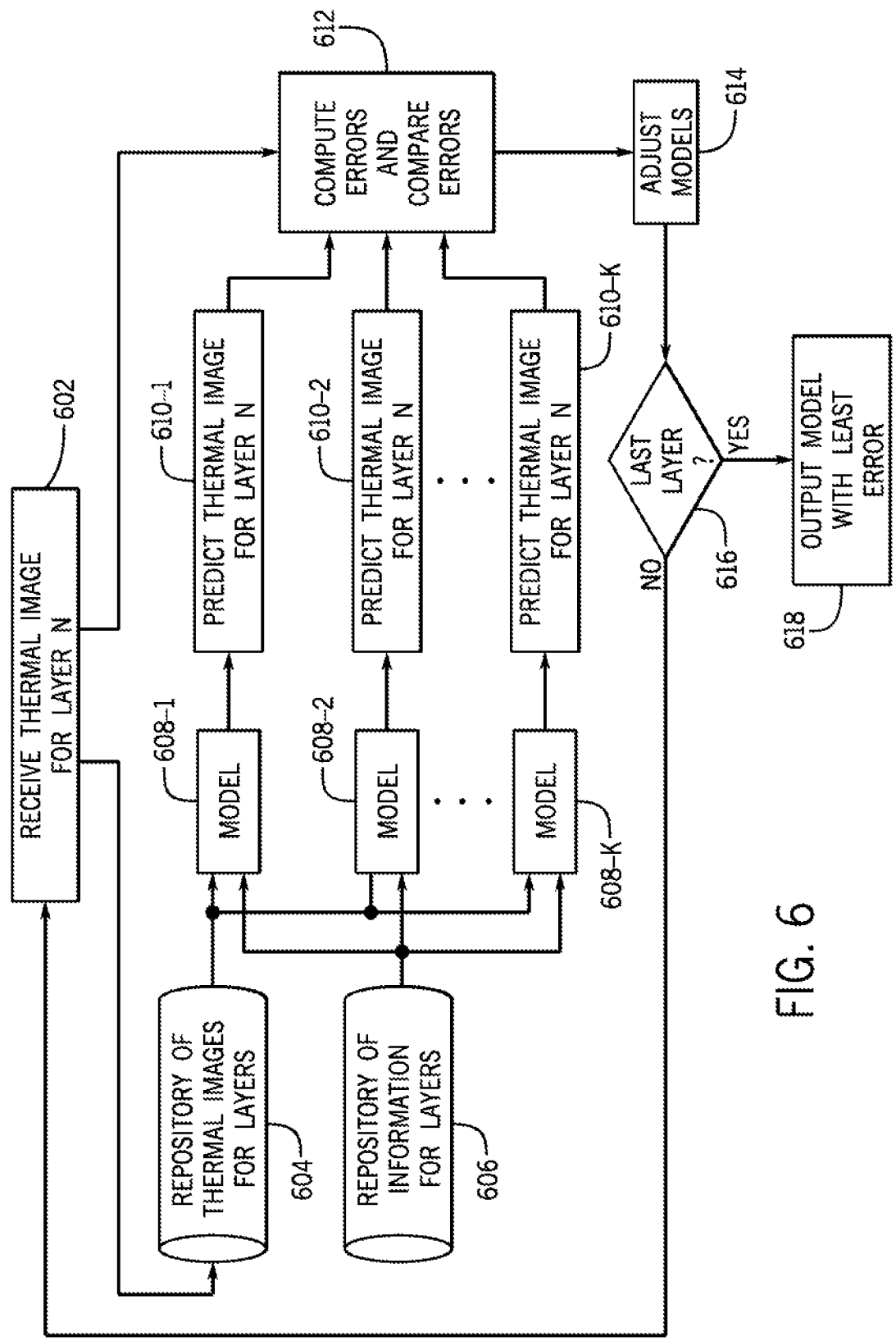
FIG. 6 is a flow diagram of a process according to additional examples.

FIG. 6 is a flow diagram of a model selection and updating process according to some implementations. The process of FIG. 6 receives (at 602) an actual thermal image for layer N, which is the thermal image obtained by the sensor(s) 415 of FIG. 4, for example. Layer N refers to the current layer.

The actual thermal image for layer N is stored into a repository 604 of thermal images for various layers, such as layers 1 to N−1 (layers printed prior to layer N). Another repository 606 stores other information for the layers, such as drop count information for each layer.

In accordance with some implementations of the present disclosure, multiple different models 608-1, 608-2, . . . , 608-K (where K≥2) can be considered, where the different models can use respective different layer models. The process of FIG. 6 seeks to determine which one of the different models 608-1, 608-2, . . . , 608-K performs the best, such that the best performing model can be selected for use in controlling 3D printing or simulation as discussed above. The process of FIG. 6 also updates the models 608-1, 608-2, . . . , 608-K as the process is iteratively performed for the multiple layers of a 3D object.

A layer model provides a model of the layers of a 3D object that have been printed so far. The layer model divides the build material into three segments: (1) a surface layer (which is the topmost layer), (2) m internal layers (m≥1), which are the m layers just below the surface layer; and (3) the remaining N−(m+1) bottom layers. The layers of these segments are arranged in a stack of build material, with one layer formed over another layer. An action of the printing system affects the surface layer directly. For example, a heating action (e.g., heat produced by the heater 414 of FIG. 4) heats the surface layer directly. Alternatively, an agent dispensing action dispenses an agent directly onto the surface layer. The m internal layers are right below the surface layer, where the m internal layers can affect the surface layer by heat transfer, for example. More internal layers can be selected for better accuracy, while less internal layers can be selected for faster calculation. The bottom layer(s) is (are) the layer(s) below the lowest internal layer of the m internal layers.

Each model of the different models 608-1 to 608-K uses a respective different layer model, which can be represented as <a, b, c>. Generally, in the tuple <a, b, c>, a is assigned a value to denote a number of surface layers (where a=1 denotes just one surface layer), b is assigned a value to denote a number of internal layers, and c is assigned a value to denote a number of bottom layers.

In other examples, a layer model can be represented with a tuple with a different number of entries, such as <a, b, c, d>. For example, the encoding <1, 2, 2, N−5> represents one surface layer, two batches of internal layers each including two layers, and N−5 bottom layers, where N represents the total number of layers.

In other examples, the layer model can also represent passes that are performed with respect to each layer. Multiple passes can be performed by the 3D printing system on each layer, where a pass can refer to a pass involving depositing a build material, preheating the build material, and dispensing an agent onto the build material.

In some examples, the model 608-1 can use a layer model represented by <1,2,N−3>, which indicates that there is one surface layer, two internal layers, and N−3 bottom layers. The model 608-2 can use a layer model represented by <1,2,N−3>, and the model 608-K can use a layer model represented by <1,k,N−(k+1)>, which indicates one surface layer, k internal layers, and N−(k+1) bottom layers.

When predicting values of a property of layer N (the topmost layer), it can be assumed that just the internal layers (and not the bottom layers) contribute to the property in layer N. Thus, using different layer models in the different models 608-1 and 608-K results in considering different numbers of internal layers when predicting values of the property of layer N. Considering more internal layers can result in increased accuracy, but can come at the expense of increased computation time.

Using the different models 608-1 to 608-K, the corresponding predicted thermal images (distributions of temperature values) are predicted (at 610-1, 610-2, . . . , 610-K, respectively). In other words, the predicting 610-1 uses the model 608-1 to predict the thermal image for layer N, the predicting 610-2 uses the model 601-2 to predict the thermal image for layer N, and so forth. Each regression model 608-1 to 608-K receives as input thermal images for previous layers (from the repository 604) and other information (from the repository 606). Note that the predicting computations 610-1 to 610-K can be performed in parallel by multiple corresponding processors or computers. Alternatively, the predicting computations 610-1 to 610-K can be performed in sequence.

The process of FIG. 6 computes (at 612) an error between each predicted thermal image for layer N (computed at 610-1, 610-2, or 610-K, respectively) and the received actual thermal image (received at 502) for layer N. In some examples, the computed error can be the squared sum of errors of temperature values at different locations of the layer N, such as according to $$\sum_{l=1}^{M} (t_l^a - t_l^p)^2,$$

where M represents the number of locations of the thermal image (e.g., number of pixels or number of dots), $t_l^a$ represents the actual temperature value at location l, and $t_l^p$ represents the predicted temperature value at the location l. A first error is computed between a first predicted distribution of temperature values for layer N (computed using the model 608-1) and the actual distribution of temperature values for layer N, a second error is computed between a second predicted distribution of temperature values for layer N (computed using the model 608-2) and the actual distribution of temperature values for layer N, and the K-th error is computed between a K-th predicted distribution of temperature values for layer N (computed using the model 608-K) and the actual distribution of temperature values for layer N. The errors for the different models 608-1 to 608-K are compared to determine which of the models 608-1 to 608-K is optimal (i.e., has the least error).

Based on the computed error for each model, the model is adjusted (at 614), such as by adjusting the weights of a neural network discussed above.

The process next determines (at 616) whether layer N that is currently processed is the last layer. If not, the process returns to task 602 to process the next layer N. When a new layer is considered, the new layer becomes the surface layer, and the previous surface layer merges with the internal layers, but one of the previous internal layers is ejected and merged into the bottom layers.

If the last layer has been processed, then the process outputs (at 618) the model, selected from among the models 608-1 to 608-K, with the least error. The output can identify the selected model, which can include its weights and the layer model used by the selected model.

Figure 7:
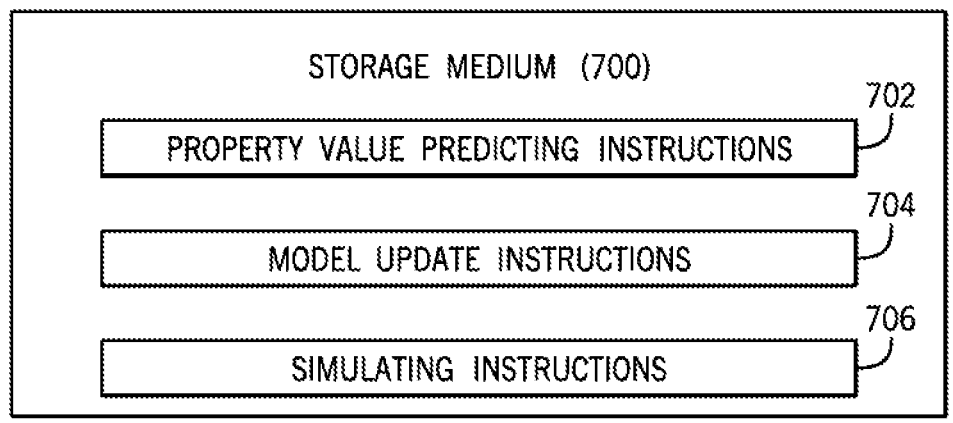
FIG. 7 is a block diagram of a storage medium storing machine-readable instructions according to some examples.

FIG. 7 is a block diagram of a non-transitory machine-readable storage medium 700 that stores machine-readable instructions that upon execution cause a system to perform recited tasks. The machine-readable instructions include property value predicting instructions 702 to predict a distribution of values of a property of a given layer to be printed as part of 3D printing, where the predicting is based on dot count information and a distribution of values of the property in a previous layer that has been printed as part of the 3D printing.

The machine-readable instructions further include model update instructions 704 to update a model based on the predicted distribution of values of the property of the given layer. The machine-readable instructions further include simulating instructions 706 to simulate an operation of 3D printing by a printing system using the updated model.

Figure 8:
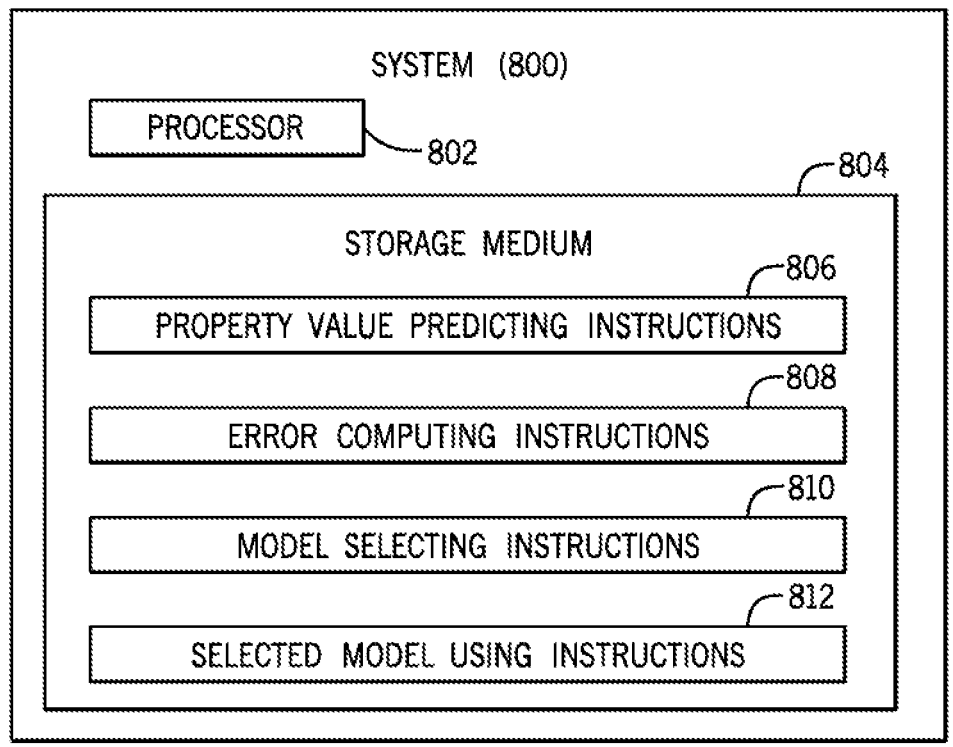
FIG. 8 is a block diagram of a system according to some examples.

FIG. 8 is a block diagram of an example system 800 that includes a processor 802 (or multiple processors 802). A processor can include a microprocessor, a core of a multi-core microprocessor, a microcontroller, a programmable integrated circuit, a programmable gate array, or another hardware processing circuit.

The system 800 further includes a non-transitory storage medium 804 that stores machine-readable instructions that are executable on the processor to perform recited tasks. Executing instructions on a processor can refer to executing the instructions on one processor or on multiple processors.

The machine-readable instructions stored in the storage medium 804 include property value predicting instructions 806 to predict, using multiple different models, respective distributions of values of a property of a given layer of build material based on information of previously printed layers of build material, where the information of each respective layer of the previously printed layers of build material include a distribution of values of the property as captured by at least one sensor of a 3D printing system. The machine-readable instructions stored in the storage medium 804 further include error computing instructions 808 to compute a respective error for each respective model of the multiple different models based on the respective distribution of values of the property of the given layer of build material produced by the respective model, and on a measured distribution of values of the property of the given layer of build material. The machine-readable instructions stored in the storage medium 804 further includes model selecting instructions 810 to select, based on the computed errors, a selected model of the multiple different models. The machine-readable instructions stored in the storage medium 804 further include model using instructions 812 to use the selected model to control 3D printing by the 3D printing system or to perform simulation of 3D printing by the 3D printing system.

The storage medium 700 or 804 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    measuring a distribution of values of a property in a first layer of build material that has been printed as part of three-dimensional (3D) printing, wherein the distribution of values includes a value of the property for each of a plurality of locations on a print target;
    receiving as input, dot count information for the first layer, wherein the dot count information for the first layer includes an amount of 3D printing agent provided at each of the plurality of locations within the first layer;
    generating, by a system comprising a processor, a predicted thermal image of a second layer that has not yet been printed as part of the 3D printing, wherein the predicted thermal image includes a distribution of values of the property for the second layer, and is based on the distribution of values of the property in the first layer and the dot count information for the first layer;
    controlling, by the system, the 3D printing of an object based on the predicted thermal image;
    wherein the predicted thermal image is generated using a plurality of different models, each respective model of the plurality of different models receiving as input the distribution of values of the property in the first layer, and outputting a respective predicted distribution of values of the property of the second layer that has not yet been printed; and
    determining which of the plurality of different models produces a least error;
    wherein the plurality of different models use respective different layer models, each respective layer model of the different layer models comprising a first number of surface layers, a second number of internal layers, and a third number of bottom layers, wherein each of the first number, second number, and third number is one or greater, and a first layer model of the different layer models differs from a second layer model of the different layer models by at least one of the second number of internal layers or the third number of bottom layers.

2. The method of claim 1, wherein the predicted thermal image is further generated based on dot count information for the second layer, wherein the dot count information for the second layer includes an amount of the 3D printing agent to be provided at each location of the plurality of locations.

3. The method of claim 2, wherein the predicted thermal image is generated using a model that receives as inputs the dot count information and the distribution of values of the property in the first layer, and that outputs the predicted thermal image.

4. The method of claim 1, further comprising:
    adjusting weights used in each of the plurality of different models in response to the determining.

5. The method of claim 4, wherein the adjusting is based on reducing an error between a predicted distribution of values of the property in a given layer and an actual distribution of values of the property in the given layer.

6. The method of claim 1, wherein the property is selected from among a temperature, a density, and a thickness.

7. The method of claim 1, wherein measuring the distribution of values of the property includes capturing the distribution of values of the property in the first layer by at least one sensor of a 3D printing system.

8. The method of claim 1, wherein the predicting includes determining that a predicted distribution of temperatures of a layer that has not yet been printed is different from a target distribution of temperatures, based on a distribution of temperatures of the first layer of the 3D object.

9. The method of claim 1, wherein controlling, by the system, the 3D printing includes modifying heating equipment of the system to produce a target level of heat, based on a deviation of a predicted temperature from a target temperature.

10. The method of claim 1, including computing an error for each respective model, wherein the error includes a squared sum of errors of temperature values at different locations of the layer that has not yet been printed.

11. The method of claim 1, wherein the predicted thermal image includes a graphical representation of the distribution of values of the property at different locations across the layer that has not yet been printed.

12. A non-transitory machine-readable storage medium storing instructions that upon execution cause a system to:
    generate a predicted thermal image of a second layer of build material that has not yet been printed as part of three-dimensional (3D) printing, wherein the predicted thermal image is based on dot count information for a first layer of build material that has been printed as part of the 3D printing and a distribution of values of a property in the first layer, wherein the distribution of values includes a value of the property for each of a plurality of locations on a print target, and the dot count information includes an amount of 3D printing agent provided at each of the plurality of locations;

compare the predicted thermal image against a target distribution of values for the second layer;

update a model based on the predicted thermal image;

use the updated model to control 3D printing by a 3D printing system or to simulate an operation of 3D printing by a printing system using the updated model;

select the model from a plurality of different models that use different layer models representing a stack of build material to be printed by the printing system;

wherein each respective layer model of the different layer models comprises a first number of surface layers, a second number of internal layers, and a third number of bottom layers, wherein each of the first number, second number, and third number is one or greater, and a first layer model of the different layer models differs from a second layer model of the different layer models by at least one of the second number or the third number.

13. A system comprising:

a processor; and a non-transitory storage medium storing instructions that are executable on the processor to:

predict, using a plurality of different models, respective distributions of values of a property of a given layer of build material that has not yet been printed as part of three-dimensional (3D) printing based on information of previously printed layers of build material, each respective model of the plurality of different models receiving as input dot count information for previously printed layers of build material and a distribution of values of the property in the previously printed layers, wherein the distribution of values includes a value of the property for each of a plurality of locations on a print target, and the dot count information includes an amount of 3D printing agent provided at each of the plurality of locations, and outputting a respective predicted distribution of values of the property of the given layer wherein the distribution of values of the property of the previous layer are captured by at least one sensor of a 3D printing system;

compute a respective error for each respective model of the plurality of different models based on a comparison of the predicted distributions of values of the property against a measured distribution of values of the property of the given layer of build material;

select the model from a plurality of different models that use different layer models representing a stack of build material to be printed by the printing system;

wherein each respective layer model of the different layer models comprises a first number of surface layers, a second number of internal layers, and a third number of bottom layers, wherein each of the first number, second number, and third number is one or greater, and a first layer model of the different layer models differs from a second layer model of the different layer models by at least one of the second number or the third number; and use the selected model to control 3D printing by the 3D printing system or to perform simulation of 3D printing by the 3D printing system.

14. The system of claim 13, wherein the distribution of values of the property captured for each respective layer of previously printed layers of build material comprises a thermal image comprising a distribution of temperature values at a plurality of locations in the respective layer.

15. The system of claim 13, wherein the instructions to predict, using the plurality of different models, respective distributions of values of the property of the given layer of build material include instructions that are executable on the processor to predict the respective distributions of values using a neural network.

16. The system of claim 13, wherein the non-transitory storage medium includes instructions that are executable on the processor to generate a predicted thermal image for each respective model of the plurality of models.

* * * * *